Figure 1:
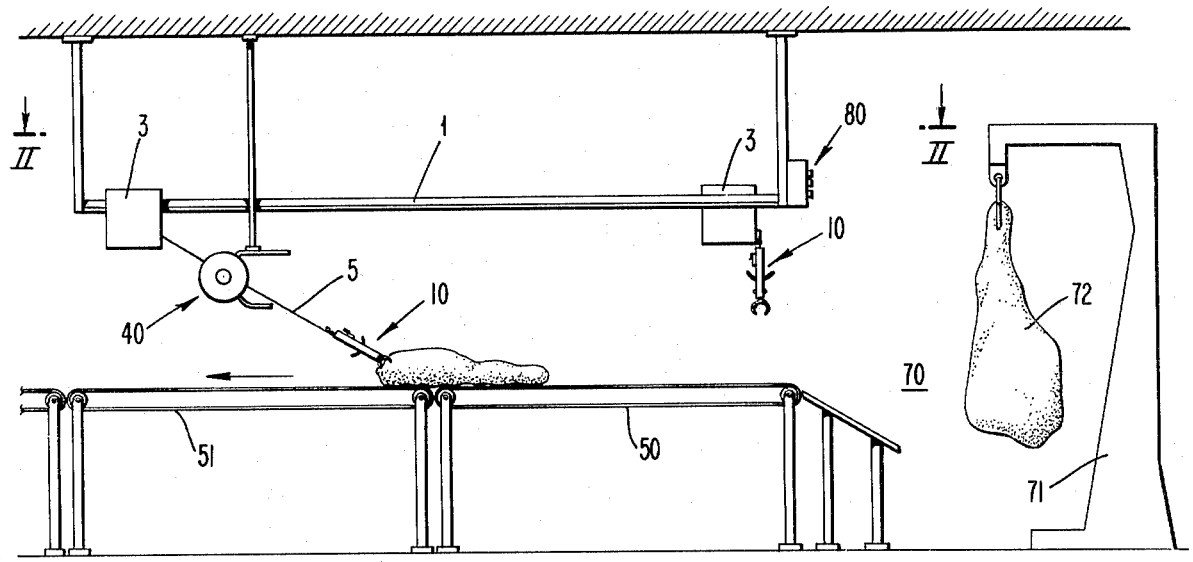

United States Patent [19]

Korhonen

[11] 4,381,582
[45] May 3, 1983

[54] PLANT AND GRIPPING MEANS FOR CUTTING UP MEAT

[76] Inventor: Kaarlo J. Korhonen, Säterivägen 18, S-161 70 Bromma, Sweden

[21] Appl. No.: 212,098

[22] Filed: Dec. 2, 1980

[51] Int. Cl.³ ............................................. A22C 17/02
[52] U.S. Cl. .................................. 17/44.3; 294/110 R
[58] Field of Search .................. 17/44.2, 44.3, 44, 24, 17/21; 294/110 R, 110 A, 115

[56] References Cited

U.S. PATENT DOCUMENTS

| | | |
|---|---|---|
| 899,391 | 9/1908 | Farrell ............................... 17/44 X |
| 1,641,508 | 9/1927 | Stark ..................................... 17/24 |
| 2,191,170 | 2/1940 | Keehn et al. .................... 294/110 A |
| 3,695,672 | 10/1972 | Mitchell ............................. 294/112 |
| 3,833,252 | 9/1974 | Redding .......................... 294/110 A |

FOREIGN PATENT DOCUMENTS 1511023 12/1967 France ............................ 294/110 R Primary Examiner—Willie G. Abercrombie
Attorney, Agent, or Firm—Burns, Doane, Swecker & Mathis

[57] ABSTRACT

A plant for handling of meat in connection with cutting up thereof, comprises two horizontal cylinders arranged side by side. Each cylinder displaceably carries a wire supply comprising a wire biased winding up reel for a wire to which a gripping tool is connected. The drive members are arranged to drive said gripping means in counterphase. A baffle means is arranged in the movement path for each tool. When the tool is pulled into engagement with the baffle means, the jaws of the tool are released and latched in open condition. When the tools are returned by the cylinders to the workstation, the hooks of the tool can be clamped into a meat piece simply by releasing the latch.

4 Claims, 6 Drawing Figures

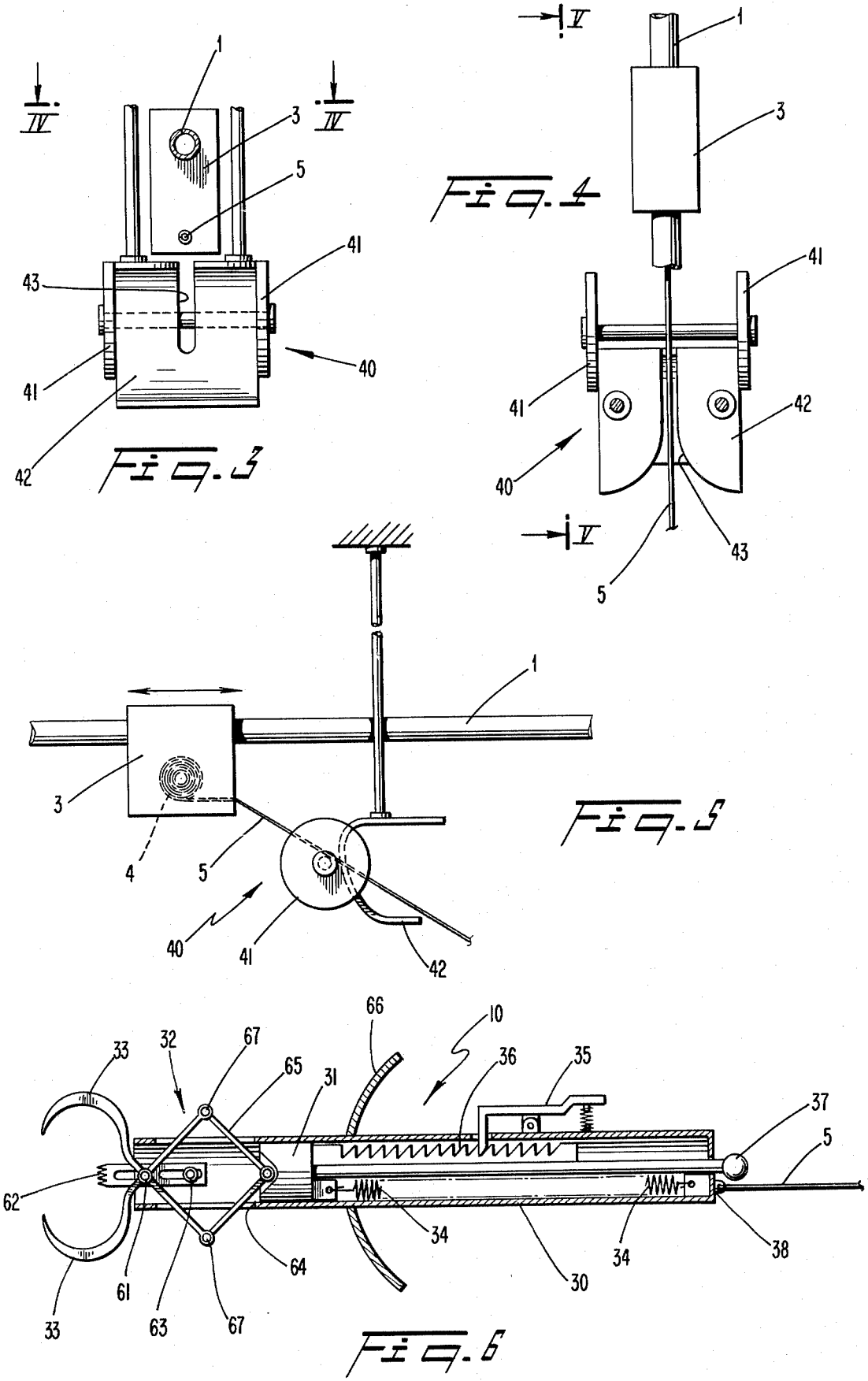

PLANT AND GRIPPING MEANS FOR CUTTING UP MEAT

The invention refers to a plant for cutting up meat, comprising a horizontally reciprocatively drivable means, a carrying means for gripping a meat piece. The invention also refers to a specific gripping means for the plant.

BACKGROUND ART

In cutting up meat in industrial butcheries, a carcass part is hung up at a stand, and the butcher cuts loose various meat-parts therefrom. Such meat-parts are often heavy and difficult to handle.

From German patent application P No. 29 25 325.6 there is known a meat gripping means which is supported by a horizontally drivable and vertically adjustable device.

The gripping means comprises a handle with movable jaws. Power lines are connected to the drive means in the handle, said drive means being controllable by means of a manually actuatable control on the handle. The drive means is coupled to the jaws to permit opening and shutting the jaws.

The known gripping means is complicated and therefore expensive to manufacture. Moreover, the butcher has to supervise the transport of the meat piece by means of said horizontally drivable means, and release the jaws when the meat piece is to be dropped onto a conveyor for further transport.

Moreover, the butcher has to await return of the gripping means to the work station before he can attach the gripping means and start a new cutting up operation.

OBJECT OF THE INVENTION

One object of the invention is to provide a plant which shortens the time between cutting up operations.

Another object is to provide a plant which eliminates the need of having the butcher release a meat piece from the gripping means.

A further object is to eliminate the power supply lines to the gripping means.

Further objects and advantages of the invention will be appreciated by those skilled in the art upon considering the following description and the attached drawings.

DISCLOSURE OF THE INVENTION

The inventive plant for cutting up meat comprises a drive means which is drivable back and forth in the horizontal direction and carries means for gripping meat pieces. The inventive improvement is that the horizontally drivable means comprises two separate drive members arranged side by side. Each member carries a separate gripping means. Said members are arranged to drive the gripping means in counterphase. Said drivable means comprises power cylinders preferably of the Origa-type, that is power cylinders, the pistons of which are exposed to the exterior of the cylinder whereby the gripping means can be connected to the piston thereof and the cylinder casing can be stationary. Each gripping means is connected to its associated drive means by means of a wire. The horizontally drivable means may carry a wire reel to which the wire is connected, said reel being biased to wind up the wire. A baffle means having a slot for the wire can be mounted in the movement path of the gripping means. The baffle means is preferably U-shaped, and the cavity thereof facing the associated gripping means and a work station at the end of the plant.

The gripping means may comprise two jaws, spring means biasing the jaws towards each other, releasable latching means for holding the jaws in open condition, and means for opening the jaws upon engagement between the gripping means and the baffle means. More specifically the gripping means may comprise a handle tube, a reciprocable rod in the tube, two levers pivotably mounted at the forward end of the tube, one end of each lever constituting gripping jaws, the other end of each lever being connected to the forward rod end via a linkage, spring means connected between the tube and the rod to bias the jaws toward closed position, a releasable latching means between the tube and the rod, the rear rod end protruding from the tube, and a wire being connected to the rear end area of the tube, whereby the jaws open and are latched in open condition when the gripping means is pulled by said member into engagement with the baffle means and the jaws then can be snap-shut by releasing the latching means.

A conveyor table is preferably arranged under the drive members. The table may comprise a first conveyor under the displacement path of the gripping means, and a second conveyor adjoining the first conveyor, the second conveyor being arranged to run at a higher speed than the first conveyor.

The wire reel may comprise an automatic wind up latch releasable by a fast pulling out of wire followed by release of the wire tension.

A work station is arranged adjacent said one end of the drive members, and control means for the drive member movement are arranged actuatable by an operator in the station.

A sloping ramp may be arranged at the station, said ramp adjoining the first conveyor.

The invention is defined in the appended claims.

In the following the invention will be described in more detail in connection with the appended drawings.

DRAWINGS

Figure 2:
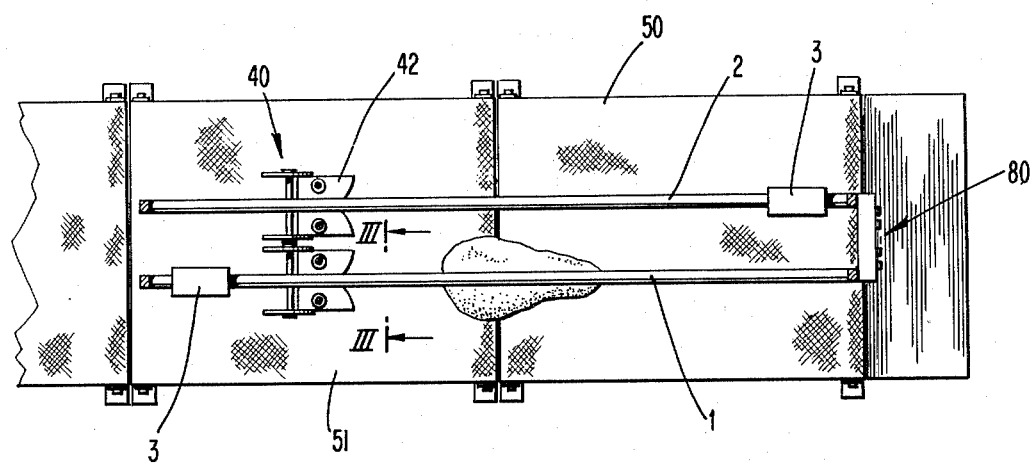

FIG. 1 shows a side view of a plant according to the invention. FIG. 2 shows a horizontal view taken along line II—II in FIG. 1. FIG. 3 shows a baffle means of the plant, in a view taken along line III—III in FIG. 2. FIG. 4 shows a horizontal view of the baffle means, in a view taken along line IV—IV in FIG. 3. FIG. 5 illustrates the baffle means and adjoining parts of the invention as seen in an elevational view taken along line V—V in FIG. 4. FIG. 6 schematically illustrates an axial section through the gripping means utilized in the inventive plant.

PREFERRED EMBODIMENT

A device for handling of meat in connection with cutting up thereof, comprises two parallel horizontal drive cylinders 1,2 which are arranged side by side. The cylinders are preferably of the Origa-type. Each cylinder 1,2 displaceably carries a wire supply 3. Each wire supply comprises a spring biased reel 4 for a wire 5 (see FIG. 5). The wire is secured to the supply. A meat gripping tool 10 is connected to the wire. The cylinders 1,2 work with a phase difference of 180°.

The tool 10 (see FIG. 6) comprises a handle tube 30 in which a rod 31 is displaceable. At the forward end of the tube a scissors mechanism 32 is journaled. The inner link ends of the mechanism is journaled at the rod 31.

The end links 33 of the mechanism are designed as meat hooks. A spring 34 biases the rod 31 toward the rear end of the tube 30 and tends to move the meat hooks 33 toward each other. A manually releasable latching mechanism 35 cooperates with a tooth rack 36 on the rod 31. The rear end 37 of the rod 31 protrudes from the rear end 38 of the tube 30. The wire 5 is connected to the rear end 38 of the tube 30.

Between the ends of the cylinders 1,2 there is a stationary control device 40 for the wire 5 and tool 10.

The device 40 comprises (see FIGS. 3–5) a pair of guide rollers 41 on opposite sides of a U-shaped guide baffle 41 the cavity of which faces the tool 10. The upper flange of the baffle 42 has a slot 43 for the wire 5. When the cylinder 1 pulls tool 10 holding a meat piece into engagement with the device 40 via the supply 3 and the wire 5, the rod end 37 of the tool 10 will be pushed into the tube 30 whereby the meat hooks 33 release the meat piece. The latching mechanism 35 then latches the meat hooks 33 in open condition wherein they are biased toward gripping position by the spring 34. When the tool 10 is returned to the cutting up station 70 by the cylinder, the tool can be attached to a new meat piece by having the operator release the latch 35.

The wire supply 3,4 provides a prolonged residence time for the tool 10 at the station 70 while the wire supply moves away therefrom and while the wire supply of the second cylinder moves back toward the station 70.

Under the cylinders 1,2 there is a conveyor table comprising a first conveyor 50 along the movement path of the tools 10, and a second conveyor 51 adjoining the first conveyor 50. The second conveyor 51 can be driven with a higher velocity than the first one.

A control panel 80 can be arranged at the end of the cylinders 1,2 at the station 70 for activation and deactivation of the cylinders when so desired.

In FIG. 1 there is schematically shown also a stand 71 supporting a carcass part 72 to which the tool 10 is to be attached when the butcher is to cut loose a meat piece from said part 72.

As is apparent from FIG. 3 for example, the shaft interconnecting the rollers 41 serves as a bearing surface for the wire 5. The rollers 41 serve to laterally guide the tool such that the rod end thereof will not slip to the side of the baffle.

The latch 35 shown in FIG. 6 may be of conventional design. Thus, the piece of tooth rack 36 may have one tooth flank perpendicular to the movement direction of rod 31, said flank facing the hook end of the tool. The tube may have an opening facing a portion of the tooth rack 36. An ordinary L-shaped latch having a gripping surface in parallel with said tooth flank is pivotably mounted on the tube 30. A spring may be arranged to urge the latch into engagement with the tooth rack. When moving the free end of the latch onto the tube, the gripping end of the latch will leave the tooth rack whereby the spring 34 will move the rod 31 rearwardly such that the meat hooks 33 move toward closed position.

The tool tube 30 has a guard plate 66 which prevents a slipping knife from hitting the hand holding the tool for maneuvering the meat piece being cut loose from the carcass part 72.

The hook levers 33 are journaled on a shaft 61 secured to the tube 30. Links 65 are at one end thereof journaled on the forward rod end. The other ends of links 65 are pivotably connected by means of a joint 67 to a respective end of the hook levers 33.

The handle tube 30 has slots 64 through which the joints 67 and adjoining parts of arms 33,65 can protrude.

A support plate 62 forming a backing for the meat piece gripped by the hooks 33 is attached to the forward tube end. The plate has elongated slots. The shaft 61 extends through one of the slots. An adjustment bolt 63 extends through another plate slot. By loosening bolt 63 the plate can be displaced longitudinally to desired axial position, whereafter the plate can be secured by tightening bolt 63. Any known latch could of course be used instead of the schematically shown one.

What is claimed is:

1. A plant for cutting up meat comprising a horizontally reciprocable drive means, means carried by said drive means for gripping meat pieces, a work station at one end of the drive means; said drive means comprising two horizontally displaceable members arranged side by side, each member carrying a reel to which a wire is connected, said reel being biased to wind up the wire; each member carrying a separate gripping means comprising two jaws, spring means biasing the jaws towards each other, each gripping means being connected to its associated member via said wire, a U-shaped baffle means being arranged in the movement path of each gripping means; releasable latching means for holding the jaws in open condition, and means for opening the jaws upon engagement between the gripping means and the baffle means; the members being arranged to drive said gripping means in counterphase.

2. A plant according to claim 1 wherein the gripping means comprises a handle tube, a reciprocable rod in the tube, two levers pivotably mounted at the forward end of the tube, one end of each lever constituting one part of the meat gripping jaws, the other end of each lever being connected to the forward rod end via a linkage, spring means connected between the tube and the rod to bias the jaws toward closed position, releasable latching means between the tube and the rod, the rear rod end protruding from the tube, and the wire being connected to the rear end area of the tube, whereby the jaws open and are latched in open condition when the gripping means is pulled by the member into engagement with the baffle means, and the jaws then can be snap-shut by releasing the latching means.

3. A plant according to claim 1 wherein a conveyor table is arranged under the drive members.

4. A plant according to claim 3 wherein the table comprises a first conveyor under the displacement path of the gripping means and a second conveyor adjoining the first conveyor, the second conveyor being arranged to run at a higher speed than the first conveyor.

* * * * *